United States Patent [19]
Stananought

[11] 3,866,440
[45] Feb. 18, 1975

[54] SAFETY GUARDS

[75] Inventor: Leonard William Stananought, Whalley, England

[73] Assignee: Atkinson's of Clitheroe Ltd., Clitheroe, England

[22] Filed: Aug. 6, 1973

[21] Appl. No.: 385,722

[30] Foreign Application Priority Data
Aug. 26, 1972  Great Britain.................39904/72

[52] U.S. Cl. .................................................. 64/18
[51] Int. Cl............................................. F16d 3/19
[58] Field of Search ........... 74/18.1, 17.8; 64/18, 17

[56] References Cited
UNITED STATES PATENTS

| | | | |
|---|---|---|---|
| 2,255,172 | 9/1941 | Johnson | 64/17 |
| 2,610,525 | 9/1952 | Sprigg | 74/17.8 |
| 2,931,201 | 4/1960 | Hubbard | 64/18 |
| 2,936,185 | 5/1960 | Olsen et al. | 64/18 |
| 3,744,324 | 7/1973 | Perkins | 74/18.1 |

Primary Examiner—Wesley S. Ratliff, Jr.
Attorney, Agent, or Firm—Norris & Bateman

[57] ABSTRACT

Safety guard for rotary drive assemblies, particularly universally jointed power take-off shafts interconnecting tractors and implements, includes a flexible bellow member preferably formed of plastics, which totally encloses the angularly movable shaft joint. A mounting locates the guard on the shaft while permitting relative rotation of the latter within the guard and one end of the bellows can be detected to allow access for uncoupling the shafts.

6 Claims, 1 Drawing Figure

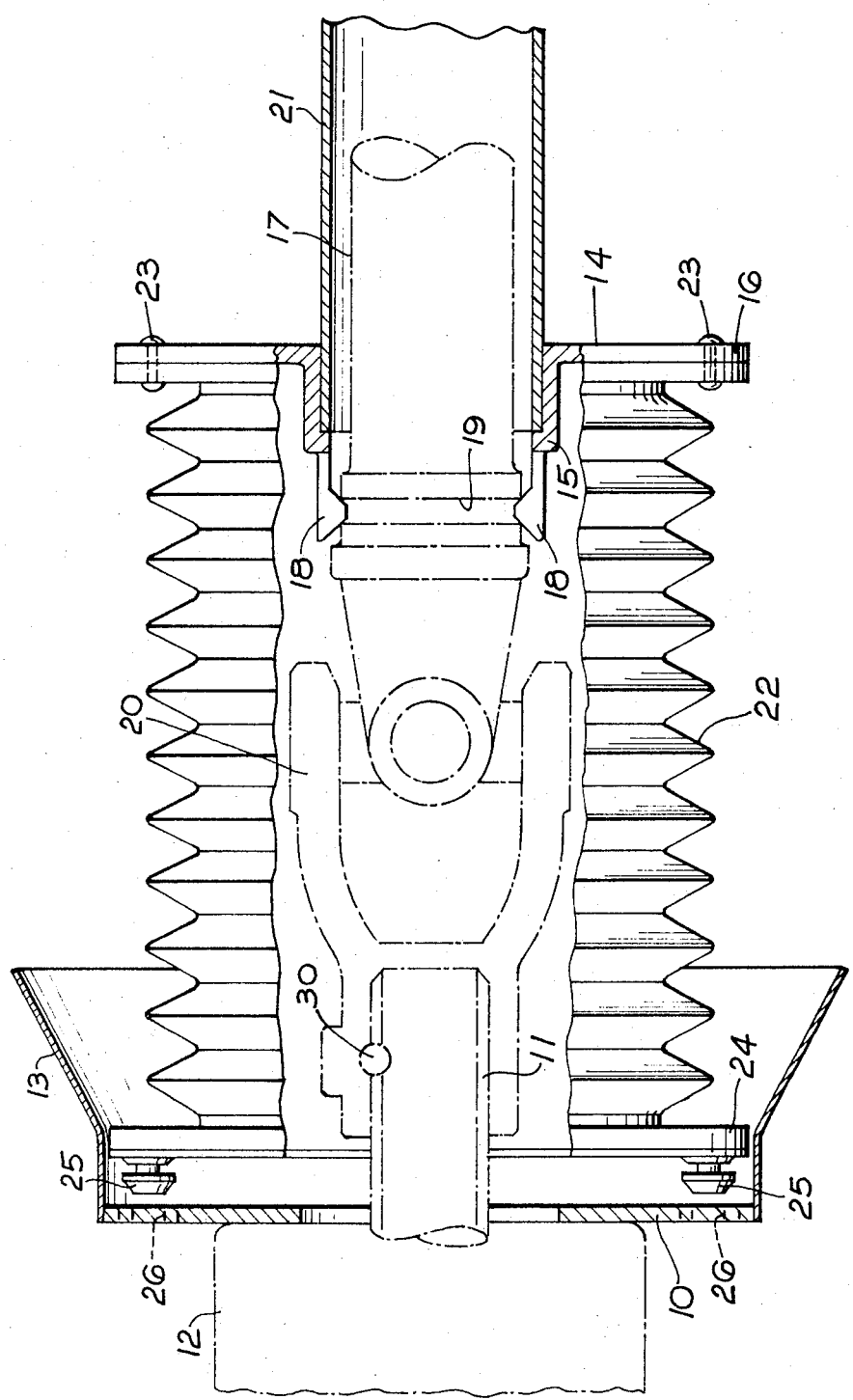

SAFETY GUARDS

This invention relates to safety guards for protecting rotary drive assemblies, particularly power take-off assemblies of the kind including a plurality of shafts operatively coupled end to end for transmitting rotary drive from a prime mover, for example an agricultural tractor, to mechanism of an agricultural or other implement operatively mounted on or trailed by the prime mover, and assemblies of this kind are hereinafter referred to as "Power take-off assemblies."

A standard power take-off assembly used with agricultural equipment includes an output main shaft journalled on the prime mover as part of the power transmission thereof and having a splined end portion which typically protrudes from a rear part of the transmission housing; and an intermediate shaft, commonly telescopic, provided with universal joints at each end, one joint being releasably coupled to said splined end portion and the other being coupled to an input main shaft of the implement mechanism in use, the joints permitting relative angular movement between the prime mover and implement.

Safety requirements involve the effective shielding of the rotating parts of the assembly without obstructing the relative angular movement referred to above and while permitting ready coupling and uncoupling of the shafts when required; and the object of the present invention is to provide durable, convenient, and effective means for shielding a universal joint operatively linking a main shaft to an intermediate shaft in said assembly.

According to the invention there is provided a safety guard for a universally jointed connection between main and intermediate shafts of a power take-off assembly including first locating means adapted to be operatively mounted around the main shaft while permitting rotation of the latter relative to said means, second locating means adapted to be operatively mounted around the intermediate shaft for angular movement therewith relative to the main shaft while permitting rotation of the latter relative to said second means, and an angularly flexible bellows member forming a continuous enclosure interconnecting said first and second locating means in operative spaced surrounding relationship to said connection but capable of being contracted axially on selective release from one of the locating means to permit access to at least a part of said connection.

A preferred embodiment of the invention is now more particularly described as applied to a safety guard for a power take-off assembly operatively drive connecting an agricultural tractor to a trailed or rear-mounted implement, and with reference to the accompanying drawing being a longitudinal part-sectional view of the guard, with the power take-off assembly shown in ghosted lines.

A first locating member in the form of an annular disc 10 is adapted to be operatively fixed co-axially around the main drive shaft 11 projecting from the rear of the tractor transmission housing 12 by being bolted to the latter. The periphery of disc 10 mounts a cone-shaped shield 13 so as to surround but be spaced radially from the projecting splined end of shaft 11. Said disc 10 and/or shield 13 may be formed from a tough synthetic plastics material.

A second locating member 14, preferably also formed from synthetic plastics material, has a hollow central boss 15 terminating at one end in a radial flange 16 of the same diameter as disc 10. The internal diameter of boss 15 is sized to be a clearance fit over the central cylindrical section of the intermediate shaft 17 and the end of boss 15 remote from flange 16 is shaped to provide a plurality of resilient fingers 18 having internal projections for snap engagement in a peripheral groove 19 provided in shaft 17 adjacent to a yoke of the universal coupling 20. Fingers 18 locate member 14 on shaft 17 while permitting relative rotation of the latter within boss 15. A cylindrical telescopic cover 21 (part only shown in drawing) for the remaining part of shaft 17 locates in an internal recess of boss 15 centrally of flange 16.

A circular section flexible bellows member 22 having circumferential corrugations or concertina folds so that it can be axially stretched and retracted has one end fastened to flange 16 by screws or rivets 23 and is provided with a mounting rim 24 at its opposite end having four headed studs 25 at equi-angular positions enabling co-axial connection to disc 10 by entering studs 25 in keyhole slots 26 provided in the disc and twisting rim 24 about the axis of shaft 11 to secure it. The direction of angular movement needed to secure rim 24 is the same as the normal operative direction of rotation of the shafts so that rotation of bellows member 22 is prevented while maintaining its attachment to disc 10 as the shafts rotate. The drawing shows rim 24 with the studs about to be entered axially into slots 26.

Bellows member 22 is formed from synthetic plastics material, preferably high density polyethelene.

Bellows member 22, when mounted, forms a continuous enclosure of the universal coupling 20 between the main and intermediate shafts 11, 17 while permitting relative angular displacement and rotation thereof within the non-rotating guard.

When it is desired to uncouple intermediate shaft 17 and universal joint 20 from main drive shaft 11, e.g. for removal of the implement, bellows members 22 is released from disc 10 by twisting rim 24 in a direction opposite to the direction of normal rotation of the shafts to free studs 25, and then pushing rim 24 axially away from disc 10 to compress the bellows and expose the yoke of joint 20 which locates on the splined end of shaft 11. The locking pin 30 of said yoke can then be released and the shafts uncoupled.

Shield 13 and disc 10 remain on the tractor to provide some protection for the exposed end of shaft 11, while the bellows member 22 remains on the intermediate shaft 17 ready for reconnection. An incidental advantage of the invention is that bellows member 22 provides a measure of protection against weather and rusting of the universal joint when the implement is detached and possibly left parked in the open air.

If the entire joint and end part of the intermediate shaft 17 is to be exposed, e.g. for repairs, fingers 18 are sprung out of engagement with peripheral groove 19 permitting the member 14 and the attached bellows to be slid along said shaft.

I claim:

1. A safety guard for a universally jointed connection between main and intermediate shafts of a power take-off assembly including first locating means adapted to be operatively mounted around the main shaft while permitting rotation of the latter relative to said means, second locating means having a bearing formation adapted to be operatively mounted upon the intermediate shaft for angular movement therewith relative to the main shaft while permitting rotation of the latter relative to said second means, and an angularly flexible and axially contractible bellows member forming a continuous enclosure joining said first and second locating means to form a continuous enclosure in operative spaced surrounding relationship to said connection said bellows member being releasably connected to one of said means so as to be capable of being contracted axially on selective release therefrom to permit access to at least a part of said connection.

2. A guard according to claim 1 wherein the first locating means and one end of the bellows member are releasably interconnected by headed studs on one of said means and member engageable in keyhole slots in the other of said member and means.

3. A guard according to claim 2 wherein the first locating means is a disc.

4. A guard according to claim 1 wherein said bearing formation is a boss including a plurality of resilient fingers for snap engagement in a peripheral groove of the intermediate shaft.

5. A guard according to claim 4 wherein the second locating means includes a flange to which the bellows member is attached.

6. A guard according to claim 1 in which the bellows member is formed from high density polyethelene.

* * * * *